United States Patent [19]

Williams

[11] Patent Number: 5,669,336

[45] Date of Patent: Sep. 23, 1997

[54] COMPLIANT DRIVE FOR INTERNAL COMBUSTION ENGINE COOLING FAN

[75] Inventor: Bruce P. Williams, Grosse Point Park, Mich.

[73] Assignee: Ford Global Technologies, Inc., Dearborn, Mich.

[21] Appl. No.: 693,580

[22] Filed: Aug. 1, 1996

Related U.S. Application Data

[63] Continuation of Ser. No. 363,787, Dec. 27, 1994, abandoned.

[51] Int. Cl.$^6$ ........................................................ F01P 7/02
[52] U.S. Cl. ........................................ 123/41.12; 123/41.49
[58] Field of Search ................................ 123/41.11, 41.12, 123/41.49; 192/48.92, 82 T

[56] References Cited

U.S. PATENT DOCUMENTS

| | | |
|---|---|---|
| 1,359,468 | 11/1920 | Schmidt . |
| 1,429,196 | 9/1922 | Dughera ................................ 192/46 |
| 1,574,173 | 2/1926 | Schall . |
| 1,629,296 | 5/1927 | Ouellet . |
| 2,246,191 | 6/1941 | Schmitz . |
| 3,010,533 | 11/1961 | Van Der Plas ........................ 192/64 |
| 3,166,171 | 1/1965 | Schwerdhofer et al. .............. 192/64 |
| 3,853,098 | 12/1974 | Ishikawa et al. ...................... 123/41.11 |
| 4,445,650 | 5/1984 | Avra et al. ............................. 242/192 |
| 4,472,162 | 9/1984 | Hitchcock ............................. 974/135 |
| 4,593,799 | 6/1986 | Ozaki .................................... 192/46 |
| 4,838,401 | 6/1989 | Nagano ................................. 192/64 |
| 5,020,648 | 6/1991 | Bush et al. ............................ 192/46 |
| 5,024,121 | 6/1991 | Hsieh .................................... 192/5 |
| 5,168,972 | 12/1992 | Smith .................................... 192/46 |

Primary Examiner—Noah P. Kamen
Attorney, Agent, or Firm—Jerome R. Drouillard

[57] ABSTRACT

A compliant drive for powering a cooling fan of an internal combustion engine includes a rotatable fan hub having a running surface for receiving a drive belt powered by the engine and a torque sensing clutch mounted to the hub and having an output flange adapted for mounting a fan thereto. The clutch is adapted to allow the transmission of torque from the hub to the output flange, but not to allow the transmission of torque from the output flange to the hub.

11 Claims, 4 Drawing Sheets ent Ser. No. 08/363,787
COMPLIANT DRIVE FOR INTERNAL COMBUSTION ENGINE COOLING FAN This is a continuation of application Ser. No. 08/363,787 filed Dec. 27, 1994 now abandoned.

BACKGROUND OF THE INVENTION

The present invention relates to a compliant mechanical drive system for powering a cooling fan intended to draw air through a heat exchanger or any other part of the engine compartment of a motor vehicle or other engine driven device.

BACKGROUND INFORMATION

A variety of engine fan clutches have been used for selectively decoupling engine driven cooling fans from their drive mechanisms. Frequently, it is desirable for the fan to be stopped if, for example, the engine's coolant temperature is below a predetermined threshold. The ability to declutch a fan from its drive mechanism is an important contributor to reductions in fuel consumption and noise associated with internal combustion engine powerplants. Unfortunately, clutched fans have created certain problems for engine designers, inasmuch as thermostatically controlled or other types of clutches have considerable rotational inertia and, as a result, may cause problems during operation of an engine equipped with such a clutch fan. An example of such a problem has been noted on certain engines in vehicles equipped with automatic transmissions. For example, during operation of the vehicle at wide open throttle transmission upshift, the engine may decelerate at an extremely high rate, albeit for only a fraction of a second, with the result that the crankshaft of the engine will momentarily slow to a speed which is less than that of the corresponding speed of the belt driven cooling fan. As a result, the cooling fan, due to its high inertia hub and clutch drive assembly, will momentarily run at a higher speed than the peripheral speed of the crankshaft pulley, thereby putting a slack section or "bubble" of drive belt between the fan's drive hub and the crankshaft pulley. This, in turn, may cause the drive belt to jump off, and separate from, the various pulleys in the engine's front end accessory drive system. Also, the drive belt may make an objectionable chirping noise as if it slips on the crankshaft pulley. The foregoing problem has been addressed to date by operating the drive belt(s) at increasingly greater tensions, which may have the undesirable result of causing premature wear of bearings and various rotating components and, of course, which necessitates more heavily constructed, and therefore more costly, bearings, brackets, and other components in order to handle the increased tension.

A system according to the present invention provides a ready solution to the problems described above by allowing the engine driven fan to momentarily run faster than the hub to which it is coupled. This ability for the fan to overrun its drive hub is hereby deemed "compliance", and the present invention therefore includes a compliant fan drive. As a result, the rotational inertia of the fan and hub assembly is not only removed as a cause for belt chirp or belt jump-off, but may also be used to allow the fan to run at a speed in excess of the very hub which is driving the fan. In essence, the present invention produces an unexpectedly superior result by allowing the fan to turn, particularly while the engine is idling, at a speed in excess of the hub member which is driving it. This promotes better flow of cooling air and thus aids in proper cooling of the engine, without the necessity of running the engine at a higher idle speed. This lower idle speed capability has the very desirable result of decreasing fuel consumption.

Other advantages of the present invention will become apparent to the reader of this specification.

SUMMARY OF THE INVENTION

An engine driven cooling fan for an internal combustion engine includes a rotatable fan hub having a running surface for receiving a drivebelt powered by the engine, a fan rotatably mounted upon the hub, and a clutch interposed between the hub and the fan for locking the fan to the hub when the hub is either increasing the rotational speed of the fan or maintaining the rotational speed of the fan at a constant value. The clutch unlocks the fan from the hub for at least part of any time period in which the rotational speed of the hub is decreasing, with the result that the fan is allowed to rotate at a speed in excess of the rotational speed of the hub during certain engine operating conditions. The clutch may further comprise a thermally responsive element which is mounted in series with the clutch, and which disengages the fan from either the clutch or the hub in the event that the operating temperature of the engine is below a predetermined value. In essence, the fan is free to rotate relatively to the hub unless the fan is locked to the hub. The fan has blading designed to rotate in a designed direction so as to supply cooling air to the engine. The clutch locks the fan to the hub when the torque transmitted to the clutch by the hub is in the design direction, but unlocks the fan from the hub when the torque transmitted to the clutch by the hub is in the direction opposite to the designed direction. In essence, the clutch comprises a torque-sensing clutch having an output flange adapted for mounting a fan thereto, with the clutch being adapted to allow the clutch to transmit torque from the hub to the output flange but not to allow the transmission of torque from the output flange to the hub. The clutch may comprise a mechanical clutch, an electromagnetic clutch, or an electromagnetic clutch operated by an electronic controller.

DETAILED DESCRIPTION OF THE PREFERRED EMBODIMENTS

Figure 1:
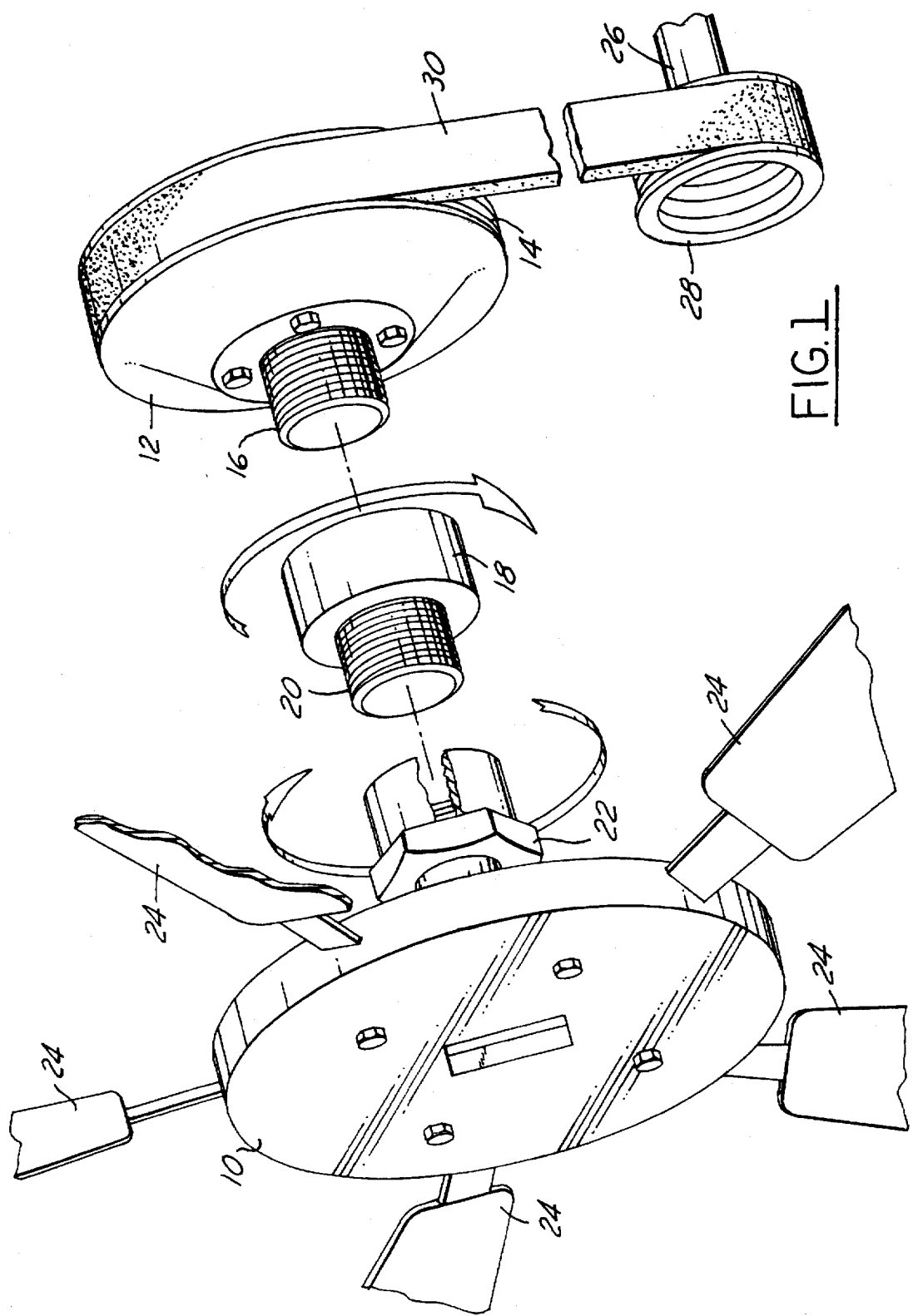
FIG. 1 is an exploded perspective view of a first embodiment according to the present invention.

As shown in FIG. 1, fan 10 having a plurality of blades 24 is driven by crankshaft 26 of an engine via pulley 28, which is rigidly attached to crankshaft 26, and by belt 30, which extends between crank pulley 28 and belt running surface 14, which is formed on the outer surface of hub 12. Hub 12 has threaded arbor 16, which threadedly engages overrunning clutch 18. Overrunning clutch 18 has a threaded arbor 20 which engages fan mount 22. Thus, overrunning clutch 18 comprises a clutch interposed between hub 12 and fan 10. The engine (not shown other than crankshaft 26) rotates hub 12 in the direction shown and, in turn, rotates overrunning clutch 18 and fan 10 in the same direction. Overrunning clutch 18 contains a sprag clutch or other type of overrunning clutch known to those skilled in the art of front end accessory drives and suggested by this disclosure. Overrunning clutch 18 may be a simple mechanical sprag clutch, or it could be an electromechanically controlled clutch, or a magnetoelectrically controlled clutch or other type of clutch known to those skilled in the art and suggested by this disclosure. In the event that an electronically controlled clutch is used, the system could have an architecture according to the block diagram of FIG. 4.

Figure 3:
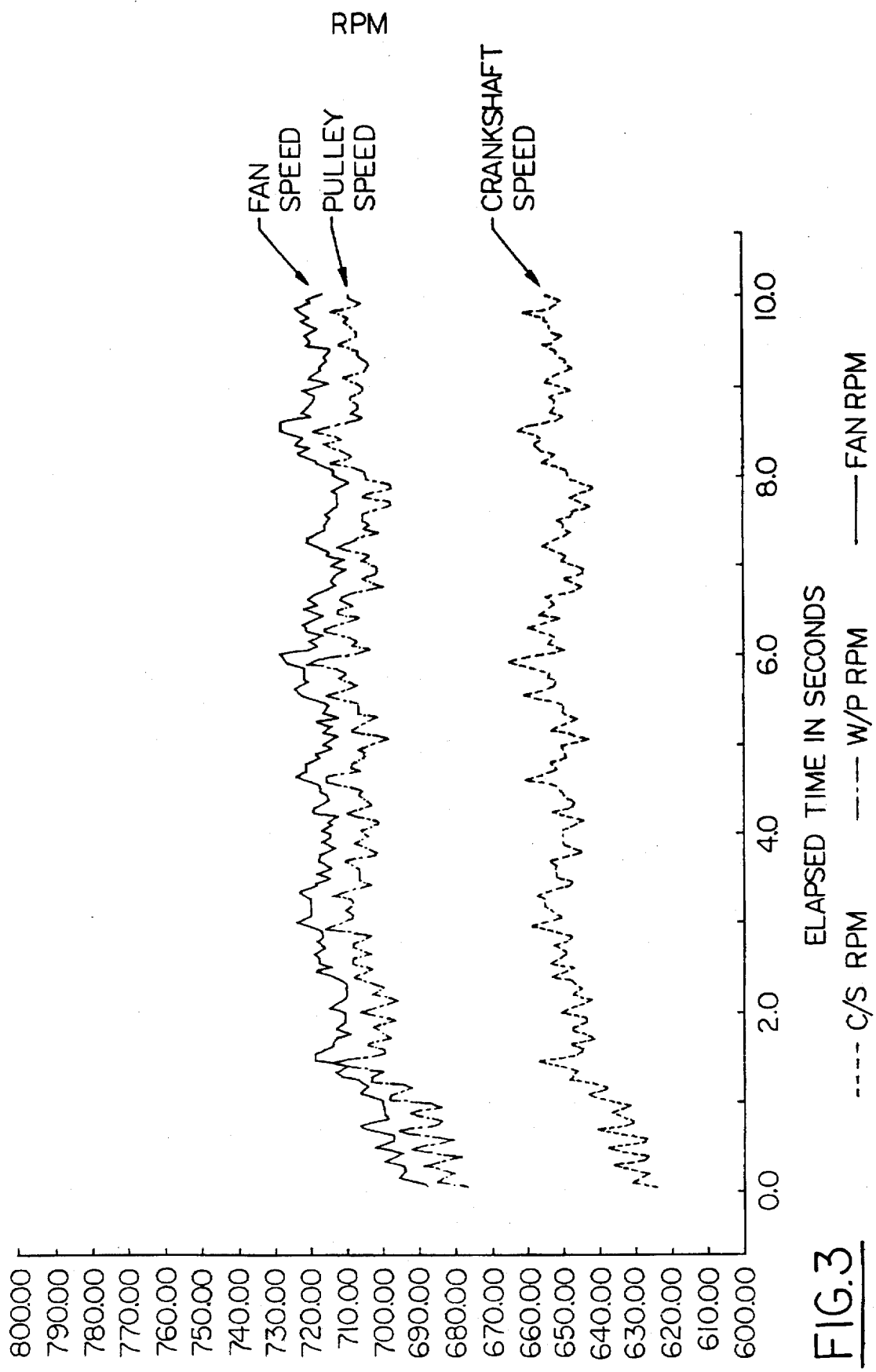
FIG. 3 illustrates the effect of having a system according to the present invention, as shown at engine idle speed.

Returning to FIG. 1, as long as crankshaft 26 is rotating in the direction shown, it will cause rotation of fan 10 in the same direction. Moreover, if the rotation of crankshaft 26 is at a constant speed, the rotational speed of fan 10 will be relatively constant. If, however, the speed of hub 12 decreases beyond a threshold deceleration value which is established by either adjusting overrunning clutch 18, or in the software of controller 56, overrunning clutch 18 will allow fan mount 22 and fan 10 to freewheel or turn for a limited period of time at a speed in excess of the rotational speed of hub 12. Thus, clutch 18 will unlock fan 10 from hub 12 for at least part of any time period in which the rotational speed of hub 12 is decreasing, with the result that fan 10 is allowed to rotate at a speed which is in excess of the rotational speed of hub 12 during certain engine operating conditions. Such an engine operating condition is shown in FIG. 3. In this figure, the engine crankshaft is operating at about 650 rpm, with variations due to the engine's firing impulses. The pulley speed is shown as being above engine crankshaft due to ratio of diameters of hub 12 to crankshaft pulley 28. In other words, hub 12 is driven at a greater speed than pulley 28. Those skilled in the art will appreciate in view of this disclosure that a system according to the present invention will work equally well in situations in which hub 12 and fan 10 are driven at the same speed as crankshaft 26, or at greater than crankshaft speed, or at fractional values of crankshaft speed.

Note that the speed of fan 10 exceeds the speed of hub 12 during the entire period of operation shown in FIG. 3. This occurs because overrunning clutch 18 senses operation in which torque transmitted to clutch 18 by hub 12 is in the designed direction, i.e., the direction tending to draw air in the desired flow path, and when the torque transmitted by hub 12 to clutch 18 is in such direction, clutch 18 locks fan 10 to hub 12. Conversely, when torque is transmitted to clutch 18 by hub 12 in the direction opposite the designed direction, as when hub 12 is slowing or decelerating because crankshaft 26 is decelerating, clutch 18 allows fan 10 to rotate at a higher speed than hub 12. Tests have shown that at idle, the average speed of fan 10 actually exceeds that of hub 12, as shown in FIG. 3. Stated another way, clutch 18 is adapted to allow the transmission of torque from hub 12 to fan 10, but not to allow transmission of torque from fan 10 to hub 12.

Operation according to FIG. 3 is beneficial because, as known by those skilled in the art, increased airflow through a radiator is very beneficial in increasing cooling capability. The unexpected results produced by the present fan drive system may be used to the advantage of the designer seeking to produce cooling at high ambient temperatures.

Figure 5:
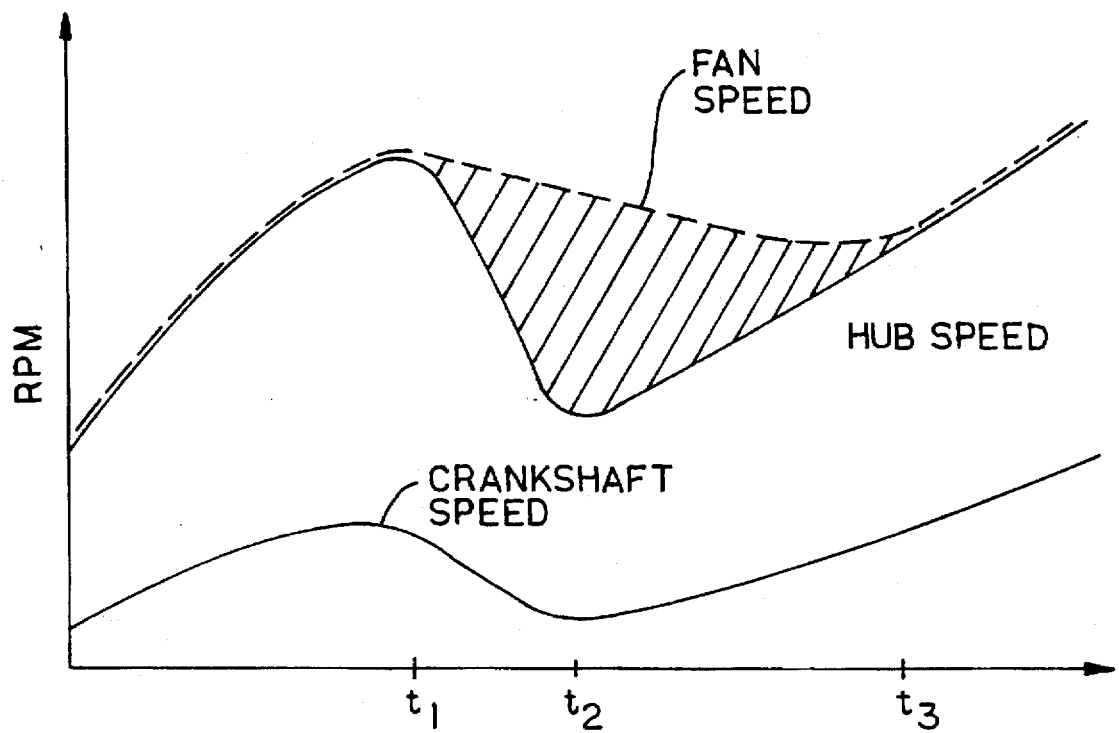
FIG. 5 is a graphical representation of engine speed and fan speed during a transmission upshift at high engine speed, showing typical traces of fan speed and fan hub speed which result from implementation of the present invention.

A further benefit of the system according to the present invention is shown in FIG. 5, wherein engine speed and fan speed are plotted against time. As shown in FIG. 5 at time $t_1$, engine speed drops at a very rapid rate, such as when the engine upshifts from a lower gear to a higher gear during a wide open throttle acceleration. As engine speed drops off between time $t_1$ and time $t_2$, the speed of hub 12 drops accordingly. Note, however, that with a clutch according to the present invention, the speed of fan 10 falls off at a much more gradual slope, and as a result, the inertia of the fan and any thermally responsive elements is compensated for, so as to prevent disengagement of the drive belt 30 from either crankshaft pulley 28, or hub 12, or for that matter, the pulleys associated with any other accessories driven by belt 30. This will also prevent objectionable noise caused by belt 30 slipping on the various pulleys. From time $t_1$ to time $t_3$, fan 10 is turning at a higher speed than is hub 12, thereby using the inertia stored in fan 10 and its mounting to pull more air through the cooling radiator.

Figures 2, 4:
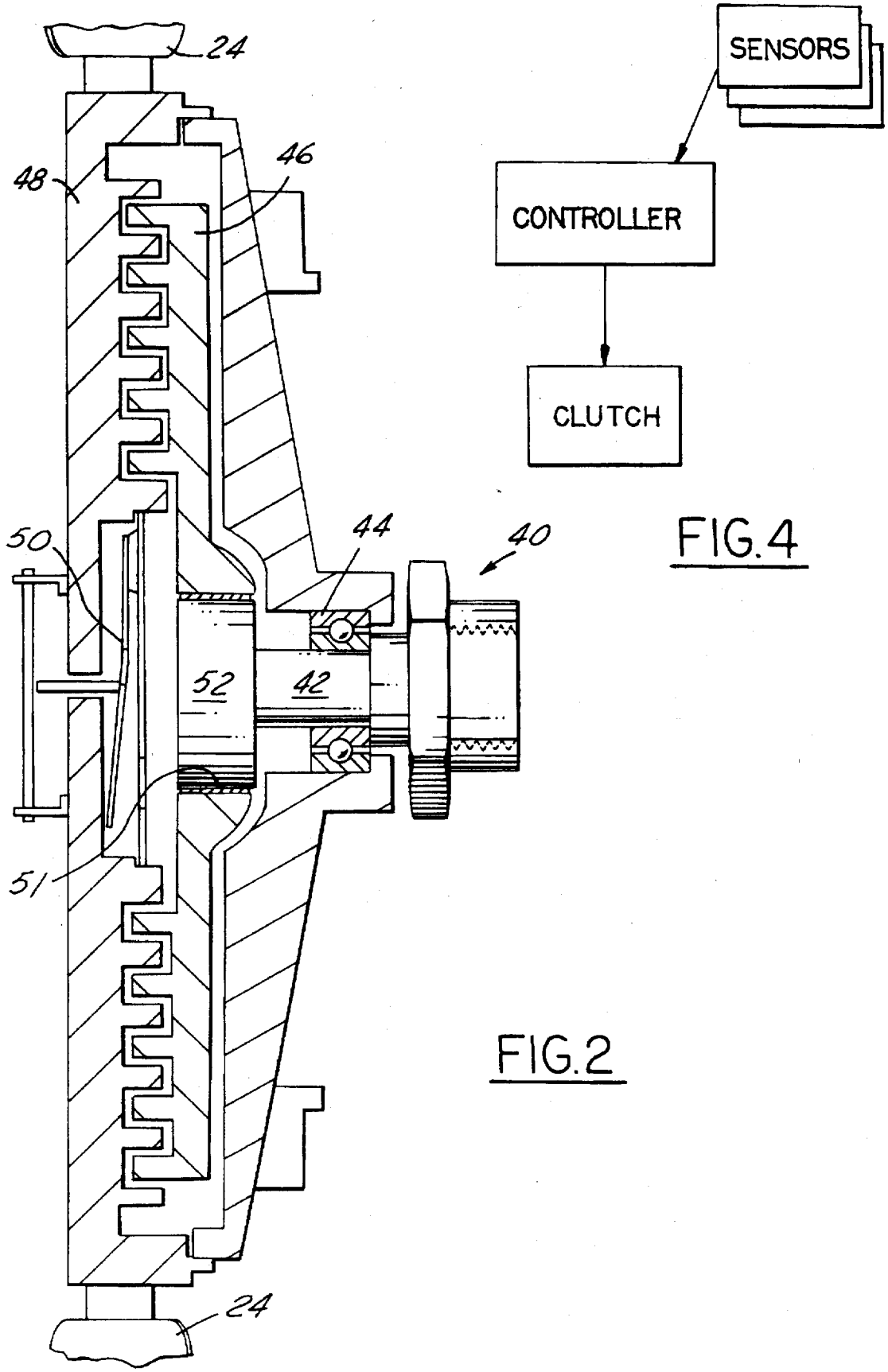
FIG. 2 illustrates an embodiment of the present invention having a thermostatically controlled fan clutch and a one-way clutch according to the present invention.
FIG. 4 is a block diagram of an embodiment according to the present invention.

FIG. 2 shows a second embodiment according to the present invention in which clutch shaft 42 has not only overrunning clutch 52 but also a thermostatically controlled or thermally responsive clutch attached thereto. In essence, the thermostatically and overrunning clutches are mounted in series, so that both clutches must be locked in order for fan blades 24 to turn in unison with clutch shaft 42.

The clutch configuration according to FIG. 2 of thermally and torque responsive fan clutch 40 includes threaded socket 54 for attaching clutch 40 to arbor 16 of hub 12. Overrunning clutch 52 is nested within bore 51 of rotor 46. Rotor 46 comprises one-half of a conventional thermally responsive clutch. Overrunning clutch 52 is also attached to clutch shaft 42. Thus, fan blades 42 will be powered only if overrunning clutch 52 and the thermally responsive elements of clutch 40 are both locked.

Labyrinth 48 comprises the other half of the thermally responsive clutch. When the clutch assembly is exposed to temperatures in excess of a predetermined threshold value, thermally responsive element 50 causes the fluid between rotor 46 and labyrinth 48 to couple the rotor to the labyrinth. Once this coupling has occurred, fan blades 24 will turn at a speed determined by the operation of overrunning clutch 52, as described above. In a wide variety of engine and vehicle operating conditions, the speed of the fan will exceed the speed of the clutch shaft 42. Overrunning clutch 52 may comprise not only a mechanical sprag clutch, but alternatively may comprise an electromagnetic clutch operated by controller 56. Such clutches are known to those skilled in the art and are currently in use for automotive air conditioning compressor drive systems. Controller 56, which is fed information from a bank of sensors 58, will unlock clutch 52 in the event that engine speed is decreasing at a rate sufficient to cause drive belt 30 to become disengaged from the various pulleys. Thus, at least one of said sensors 58 may comprise an engine speed sensor. Other sensors could, for example, include a fan drive torque sensor.

While the invention has been shown and described in its preferred embodiments, it will be clear to those skilled in the arts to which it pertains that many changes and modifications may be made thereto without departing from the scope of the invention.

I claim:

1. A compliant drive system and cooling fan for an internal combustion engine, comprising:
   a rotatable fan hub having a running surface for receiving a drive belt powered by the engine;
   a fan rotatably mounted upon the hub; and
   a clutch interposed between the hub and the fan for locking the fan to the hub when the hub is either increasing the rotational speed of the fan or maintaining the rotational speed of the fan at a constant value, with said clutch unlocking the fan from the hub at least part of any time period in which the rotational speed of the hub is decreasing, with the result that said fan is allowed to rotate at a speed in excess of the rotational speed of said hub during certain engine operating conditions, with said clutch further comprising a thermally responsive element interposed between said fan and said clutch, with said thermally responsive element serving to disengage said fan from said hub in the event that the operating temperature of the engine is below a predetermined value.

2. A drive system and fan according to claim 1, wherein said clutch comprises a one-way sprag clutch.

3. A drive system and fan according to claim 1, wherein said clutch comprises an electromagnetic clutch operated by an electronic controller.

4. An engine driven cooling fan for supplying cooling air to an internal combustion engine, comprising:
- a rotatable fan hub having a running surface for receiving a drive belt powered by the engine;
- a fan rotatably mounted upon the hub such that the fan is free to rotate relatively to the hub unless the fan is locked to the hub, with the fan having blading designed to rotate in a design direction so as to supply cooling air to the engine; and
- a clutch interposed between the hub and the fan for locking the fan to the hub when the torque transmitted to the clutch by the hub is in the design direction, with said clutch unlocking the fan from the hub when the torque transmitted to the clutch by the hub is in the direction opposite to the design direction, with said clutch transmitting torque pulses thereby causing the fan to turn at an average speed in excess of the speed of the hub during idle operation, with said fan being powered exclusively by the hub during engine operation.

5. A fan according to claim 4, wherein said clutch further comprises a thermally responsive element interposed in series with said fan and said clutch, with said thermally responsive element serving to disengage said fan from said clutch in the event that the operating temperature of the thermally responsive element is below a predetermined value, such that the fan will be powered by the engine only if both the clutch and the thermally responsive element are locked.

6. A fan according to claim 5, wherein said thermally responsive element comprises a viscous coupling which engages said fan and said hub when the temperature of the coupling reaches a predetermined value.

7. A fan according to claim 5, wherein said clutch and said thermally responsive element are positioned within a common housing having a first end attached to said hub and a second end attached to said fan.

8. A compliant drive for powering a cooling fan of an internal combustion engine, comprising:
- a rotatable fan hub having a running surface for receiving a drive belt powered by the engine; and
- a torque sensing clutch mounted to the hub and having an output flange adapted for mounting a fan thereto, with said clutch being adapted to allow the clutch to transmit torque from the hub to the output flange, but not to allow the transmission of torque from the output flange to the hub, with said clutch transmitting torque pulses thereby causing the fan to turn at an average speed in excess of the speed of the hub during idle operation, with said fan being powered exclusively by the hub during engine operation.

9. A drive according to claim 8, wherein said clutch comprises a mechanical clutch.

10. A drive according to claim 8, wherein said clutch comprises an electromagnetic clutch.

11. A drive according to claim 8, wherein said clutch is operated by an electronic controller.

* * * * *